US008762969B2

(12) United States Patent
Meijer et al.

(10) Patent No.: US 8,762,969 B2
(45) Date of Patent: Jun. 24, 2014

(54) IMMUTABLE PARSING

(75) Inventors: Henricus Johannes Maria Meijer, Mercer Island, WA (US); John Wesley Dyer, Monroe, WA (US); Thomas Meschter, Renton, WA (US); Cyrus Najmabadi, New York, NY (US)

(73) Assignee: Microsoft Corporation, Redmond, WA (US)

( * ) Notice: Subject to any disclaimer, the term of this patent is extended or adjusted under 35 U.S.C. 154(b) by 949 days.

(21) Appl. No.: 12/187,753

(22) Filed: Aug. 7, 2008

(65) Prior Publication Data

US 2010/0037212 A1 Feb. 11, 2010

(51) Int. Cl.
*G06F 9/45* (2006.01)

(52) U.S. Cl.
USPC ........... 717/143; 717/140; 717/151; 717/144; 717/145

(58) Field of Classification Search
None
See application file for complete search history.

(56) References Cited

U.S. PATENT DOCUMENTS

| | | | | |
|---|---|---|---|---|
| 4,724,521 A | * | 2/1988 | Carron et al. | 717/175 |
| 5,193,192 A | * | 3/1993 | Seberger | 717/143 |
| 5,487,147 A | * | 1/1996 | Brisson | 714/1 |
| 5,687,384 A | | 11/1997 | Nagase | |
| 5,748,961 A | * | 5/1998 | Hanna et al. | 717/145 |
| 5,857,212 A | * | 1/1999 | Van De Vanter | 715/234 |
| 5,884,083 A | * | 3/1999 | Royce et al. | 717/143 |
| 5,903,756 A | * | 5/1999 | Sankar | 717/106 |
| 5,963,894 A | * | 10/1999 | Richardson et al. | 704/9 |
| 5,991,539 A | * | 11/1999 | Williams | 717/143 |
| 6,073,239 A | * | 6/2000 | Dotan | 726/24 |
| 6,209,124 B1 | * | 3/2001 | Vermeire et al. | 717/114 |
| 6,223,150 B1 | | 4/2001 | Duan et al. | |
| 6,424,982 B1 | | 7/2002 | Vogel | |
| 6,631,346 B1 | | 10/2003 | Karaorman et al. | |
| 7,039,240 B2 | * | 5/2006 | Greene et al. | 382/229 |
| 7,089,541 B2 | | 8/2006 | Ungar | |
| 7,913,238 B2 | * | 3/2011 | Zatloukal et al. | 717/143 |
| 2001/0032281 A1 | * | 10/2001 | Daynes | 710/200 |
| 2001/0044811 A1 | * | 11/2001 | Ballantyne et al. | 707/513 |
| 2002/0111951 A1 | * | 8/2002 | Zeng | 707/100 |
| 2003/0106049 A1 | * | 6/2003 | Ungar | 717/143 |
| 2003/0172368 A1 | * | 9/2003 | Alumbaugh et al. | 717/106 |
| 2005/0114771 A1 | * | 5/2005 | Piehler et al. | 715/536 |
| 2006/0095900 A1 | | 5/2006 | Petersen et al. | |
| 2006/0117307 A1 | * | 6/2006 | Averbuch et al. | 717/143 |
| 2007/0169038 A1 | * | 7/2007 | Shankar et al. | 717/143 |
| 2007/0283441 A1 | * | 12/2007 | Cole et al. | 726/25 |
| 2008/0075099 A1 | * | 3/2008 | Alao et al. | 370/401 |
| 2008/0281580 A1 | * | 11/2008 | Zabokritski | 704/9 |
| 2010/0023798 A1 | * | 1/2010 | Meijer et al. | 714/2 |

OTHER PUBLICATIONS

"A Framework for Expressing Prioritized Constraints Using Infinitesimal Logic", Agarwal et al., B.Sc., University of Victoria, 2003.*

(Continued)

*Primary Examiner* — Isaac Tecklu
(74) *Attorney, Agent, or Firm* — Nicholas Chen; Brian Haslam; Micky Minhas

(57) ABSTRACT

Immutable structures are employed to effect immutable parsing. In particular, an immutable parsing configuration, comprising a stack and lookahead buffer, is utilized by a parser to perform lexical and syntactical analysis of an input stream and optionally output an immutable parse tree or the like. Performance with respect to the immutable structures can be optimized utilizing sharing and lazy computation. In turn, immutability benefits are afforded with respect to parsing including safe sharing amongst services and/or across multiple threads as well as history preservation, among other things.

19 Claims, 17 Drawing Sheets

(56) References Cited

OTHER PUBLICATIONS

Chen, et al. A Parallel Augmented Context-Free Parsing System for Natural Language Analysis http://nlg3.csie.ntu.edu.tw/conference_papers/rocling1992.pdf. Last accessed Apr. 30, 2008, 1 page.

Van Lohuizen. Parallel Processing of Natural Language Parsers, Jan. 26, 2000. Appeared in Parco'99. Delft University of Technology. http://www.pds.twi.tudelft.nl/pubs/papers/parco99.pdf. Last accessed Apr. 30, 2008, 6 pages.

Jain, et al. Parsec A Structured Connectionist Parsing System for Spoken Language. 0-7803-0532-9/92 IEEE http://ieeexplore.ieee.org/iel2/626/5894/00225936.pdf?tp=&isnumber=&arnumber=225936. Last accessed Apr. 30, 2008, 4 pages.

Matsumoto, et al. A Parsing System Based on Logic Programming http://dli.iiit.ac.in/ijcai/IJCAI-87-VOL2/PDF/014.pdf. Last accessed Apr. 30, 2008, 4 pages.

Van Lohuizen. Survey of Parallel Context-Free Parsing Techniques. IMPACT-NLI-1997-1, Jul. 29, 1997. http://citeseer.ist.psu.edu/cache/papers/cs/20726/http:zSzzSzwww.pds.twi.tudelft.nlzSz~mpvlzSzpublicationszSzpds-1997-003.pdf/vanlohuizen97survey.pdf. Last accessed Apr. 30, 2008, 64 pages.

Tree data structures http://people.cis.ksu.edu/~schmidt/300s05/Lectures/Week7b.html. Last accessed May 1, 2008, 7 pages.

Semantic Analysis, CSI 43, Autumn 2007, handout 20, Oct. 24, 2007. http://www.stanford.edu/class/cs143/handouts/20-Semantic-Analysis.pdf. Last accessed May 1, 2008, 15 pages.

* cited by examiner

IMMUTABLE PARSING

BACKGROUND

Parsing systems enable programs to either recognize or transcribe patterns matching formal grammars. Today many parsing systems are written by hand while others are auto-generated. They are found in compilers, natural language processing, machine communication, protocols, computer security, and many other domains. In compilers, for instance, parsers are integral to many functions including versioning, ambiguity resolution, and error recovery, among other things.

More specifically, parsers can perform syntactic analysis to verify input syntax. A stream of characters is lexically analyzed to recognize a sequence of tokens such as keywords, operators, and identifiers, among others. Often, these tokens are employed to generate a parse tree or a more compact abstract syntax tree (AST) as a function of a programming language grammar. The tree can be employed as a basis for subsequent processing including semantic analysis, optimization, and code generation.

Typically, mutability is leveraged at least implicitly to optimize programs including parsing systems in terms of resource utilization and performance. Mutability is a property of a programmatic construct that refers to an ability to change or be changed. For example, a type is mutable if the value of an instance of that type is allowed to change. By contrast, immutability refers to an inability to change. Accordingly, if the value of an instance of a type is not allowed to change, then the type is immutable.

Resource utilization is optimized by simply modifying or updating current structures as needed as opposed to generating multiple copies. For instance, mutable structures are very seductive with respect to parsing, and more specifically parsing and an integrated development environment (IDE). By way of example, as a user enters code into an editor of an IDE, a parse tree or the like can be updated to include the additional code or alteration of current code. Stated differently, a single, updatable representation of the program is cached and/or persisted and synchronized with the most current program version.

As per performance optimization, at least one of two approaches is taken conventionally. First, algorithms are developed that perform synchronous processing faster (e.g., quick sort, bubble sort . . . ) with the implicit understanding that constructs are mutable. Once a good algorithm is established, programmatic statements and/or instructions are analyzed and hacked. In other words, there is a lot of lower level instruction alteration and/or bit twiddling.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to immutable parsing. Rather than implementing parsing utilizing mutable structures that can change, immutable structures are employed that are not subject to change subsequent to creation. More specifically, parsing including lexical and syntactical analysis can be performed with respect to an immutable configuration comprising an immutable stack and input/lookahead buffer in accordance with an aspect of the disclosure. In addition, an immutable parse tree or the like can be the resultant output of such as system. Employment of immutable structures provides a degree of safety with respect to interaction with other processes, services or the like since parser state cannot be altered unintentionally. Furthermore, parsing performance can be improved since immutable structures are amenable to multithreading and can therefore leverage benefits afforded by concurrent or parallel processing. Other advantages associated with immutable structures include trivial versioning and backtracking, among other things. Still further yet, in accordance with an aspect of the disclosure, the performance or resource utilization, hit related to saving multiple immutable versions can be substantially mitigated by sharing and/or lazy computation.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Systems and methods pertaining to immutable parsing are described in detail hereinafter. Parsing systems operate on immutable parser configurations each including an immutable stack and lookahead buffer. An immutable parse tree, or the like, can be generated by a parsing system to capture results of lexical and/or syntactic analysis for subsequent processing. Construction of such immutable structures can involve sharing of common elements amongst previous versions to preserve resource utilization. Further, the immutable structures can be leveraged to enable safe passing of state information with respect to conflict resolution and/or error recovery, for example, as well as lazy, and/or concurrent processing, among other things.

Various aspects of the subject disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Figure 1:
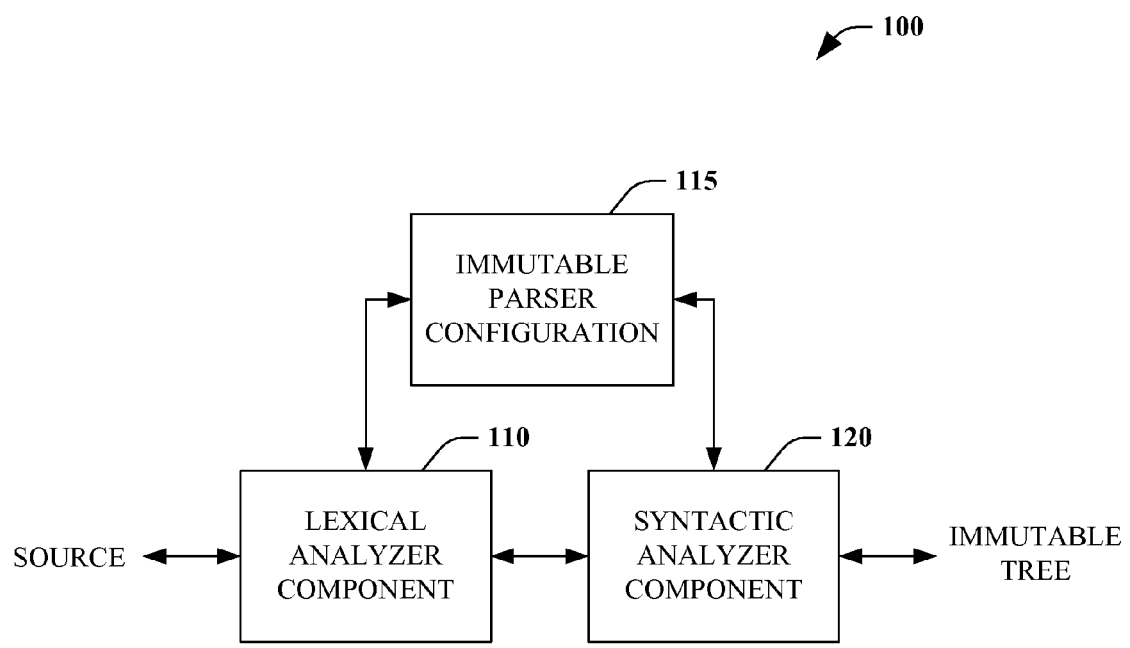
FIG. 1 is a block diagram of an immutable parse system according to an aspect of the disclosed subject matter.

Referring initially to FIG. 1, an immutable parse system 100 is illustrated in accordance with an aspect of the claimed subject matter. The system 100 includes a lexical analyzer component 110 (also known as a lexer) and a syntactic analyzer component 120. These analyzers 110 and 120 perform parsing functionality with respect to an immutable parser configuration 115 and optionally produce an immutable parse tree that captures the results of analysis for subsequent processing.

The lexical analyzer component 110 receives or retrieves a source including a sequence of characters or the like. For example, the source can either correspond to a natural or program language. Upon source acquisition, the lexical analyzer component 110 can transform the source into a sequence of tokens, or blocks of characters, in accordance with a set of rules of a language grammar. In one instance, the lexical analyzer component 110 can include a separate scanner and tokenizer component (not shown) to bifurcate functionality.

The syntactic analyzer component 120 acquires a stream of tokens from the lexical analyzer that identifies valid as well as invalid sets of tokens or expressions in accordance with a grammar. Optionally, the syntactic analyzer component 120 can produce a parse tree or the like (e.g., abstract syntax tree) that represents the structure of a source according to a language grammar.

Unlike conventional parsers and/or lexers, the lexical analyzer component 110 and/or syntactic analyzer component 120 operate on or with respect to immutable parser configurations 115. Furthermore, the syntactic analyzer component 120 can construct an immutable parse tree. Immutability refers to an inability of a structure such as a type or object to change after construction or at least appear to the outside world not to change (e.g., logical immutability). Immutable types or the like are not a feature of most programming languages per se. However, immutability generally refers to a style of structure construction. Once a structure is constructed, it is not subsequently changed.

Conventionally, parsing systems used mutability to achieve high performance. However, this leads to several problems. First, a single parser cannot be shared across multithreads or documents precluding performance gains available through highly concurrent systems. Second, versioning becomes difficult as destructive updates prevent preservation of history of changes to a parse tree. Third, providing extensibility points that are safe is difficult because any user callouts can potentially corrupt the state of a parser system. Fourth, non-determinism and speculative processes typically involve backtracking and the presence of mutable data radically complicates mutable systems. Further, immutable systems enable new performance optimizations such as sharing and lazy computation that are not available to their mutable counterparts.

For example, integrated development environments (IDEs), provide "undo" services to allow users to revisit previous version of their text files. With a destructive parsing system, an "undo" to a previous text version would cause a costly new reparse in order to bring an integrated compiler's internal structures up to date with a text buffer. The immutable parsing system 100 allows both parser and parser results to be associated with every text version in an efficient (both in time and memory) manner.

Another example is a typical batch compiler. In the system, error recovery is important and often requires lookahead and backtracking. Today, many such systems are being rewritten to use the advances made with multi-core processors. However, these parsing systems use destructive updates to their internal data structures and therefore are not suitable to multithreaded use. Employing an immutable system, the compiler can spread work across multiple threads in a safe manner.

Figure 2:
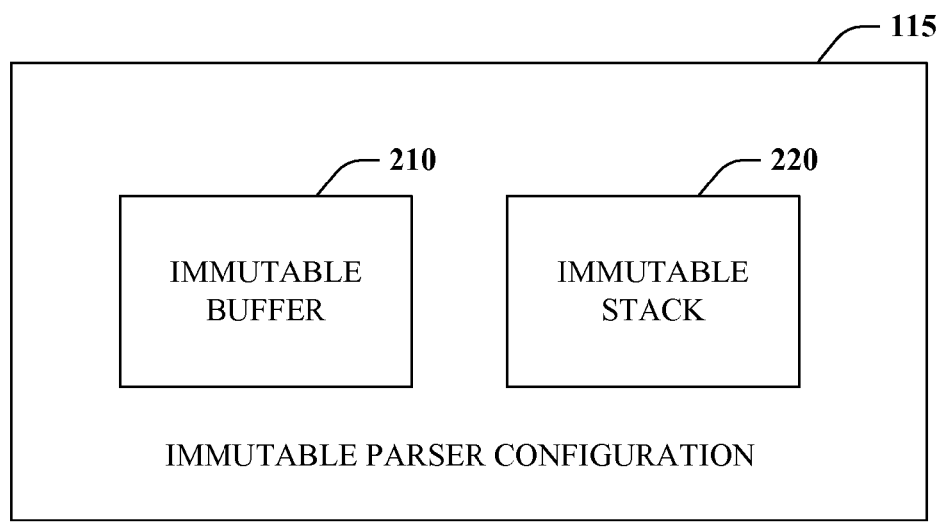
FIG. 2 is a block diagram of a representative parser configuration in accordance with a disclosed aspect.

FIG. 2 illustrates an exemplary immutable parser configuration 115 in accordance with an aspect of the claimed subject matter. As shown, the configuration 115 includes an immutable buffer 210 and an immutable stack 220 (both of which can be components as defined herein). In essence, the parser configuration 115 is an amalgamation of the buffer 210 and the stack 220 and is therefore immutable by construction.

The immutable buffer 210 also referred to as an input buffer or lookahead buffer provides a sequence of characters or the like for parsing. In accordance with one embodiment, the immutable buffer 210 can save buffer history to enable backtracking, for example. In particular, the immutable buffer component 210 can remember referenced history and remove or otherwise make referenced history available for garbage collection. Furthermore, according to an aspect, the buffer 210 can appear to be modified by appending new input states to the front of the immutable structure thereby allowing the future to be changed.

The immutable stack 220 records parsing history. It is employed to facilitate identification of tokens and expressions, among other things. In accordance with one embodiment, the immutable stack can be nondeterministic, where stack items can point to "n" items rather than simply one item, although that is also possible. In other words, the stack 220 can be a special cactus stack. In accordance with one implementation, the stack can be a rooted, directed, acyclic graph with a single sink node. This enables the parser to hold onto multiple pasts similar to the immutable buffer 210. Further yet, in accordance with an aspect, the stack 220 can appear to change by appending states to the end of the stack.

What follows is exemplary code to facilitate description of one possible implementation. Of course, the subject claims are not limited thereto. Many other implementations are also possible and intended to be with in the scope of the claimed subject matter. The sole purpose of the below code and explanation is to aid clarity and understanding not to limit implementations or equivalents.

The immutable parser configuration 115 can have the following interface:

```
public class ParserConfiguration<TStack, TInput>
{
    public ParserConfiguration(TStack stack, TInput input);
    public TInput Input { get; }
    public TStack Stack { get; }
}
```

As specified, there is no way to change the configuration after it has been constructed. One can "get" the input buffer and stack, but cannot change or "set" it. As a result, the parser configuration is immutable.

"TInput"" can be implemented by a type such as the following:

```
public interface IChain<T> : IEnumerable<T>
{
    T Value { get; }
    IChain<T> Next { get; }
    IEnumerable<T> GetValuesUntil(IChain<T> exclusiveSentinel);
}
```

In this case, there is an "IChain" that is a linked list comprising a value and a next that may or may not be materialized (lazy computation is possible). The "IChain" is implemented with an "IEnumerable", which defers computation until iteration is performed over a collection. In operation, a lexer can return an "IEnumerable" of tokens from an input source. That means that it does not actually lex out the tokens until each token is called. Here, an "IChain" is constructed out of an "IEnumerable" so that elements can be iterated through, but while also saving the history that has already been enumerated. In other words, "IEnumerable" only allows forward iteration, whereas "IChain" also allows backward iteration through previously iterated values.

"IStack" can be implemented by a type as follows:

```
public interface IStackLink<A>
{
    A Value { get; set; }
    StateStack<A> Stack { get; }
}
public class StateStack<A> : IStackLink<A>
{
    public StateStack(short state);
    public StateStack(StateStack<A> previous, short state, A value);
    public int DeterministicDepth { get; }
    public bool IsBottom { get; }
    public bool IsDeterministic { get; }
    public IEnumerable<IStackLink<A>> Links { get; }
    public StateStack<A> Stack { get; }
    public short State { get; }
    public A Value { get; set; }
    public void AddLink(IStackLink<A> link);
    public void InvalidateDeterministicDepth( );
    public StateStack<A> Pop( );
    public override string ToString( );
}
```

The immutable stack 220 can be implemented as an "IStackLink" providing a linked list of state stacks ("StateStack"). The state stacks are implemented as nondeterministic. Accordingly, a stack element can refer to more than one other element in a modified cactus form.

In sum, the parser configuration 115 is composed of an immutable input buffer 210 and immutable, nondeterministic state stack 220. Moreover, these two structures can be employed to represent a parser configuration at any point in time during a parse.

Figure 3:
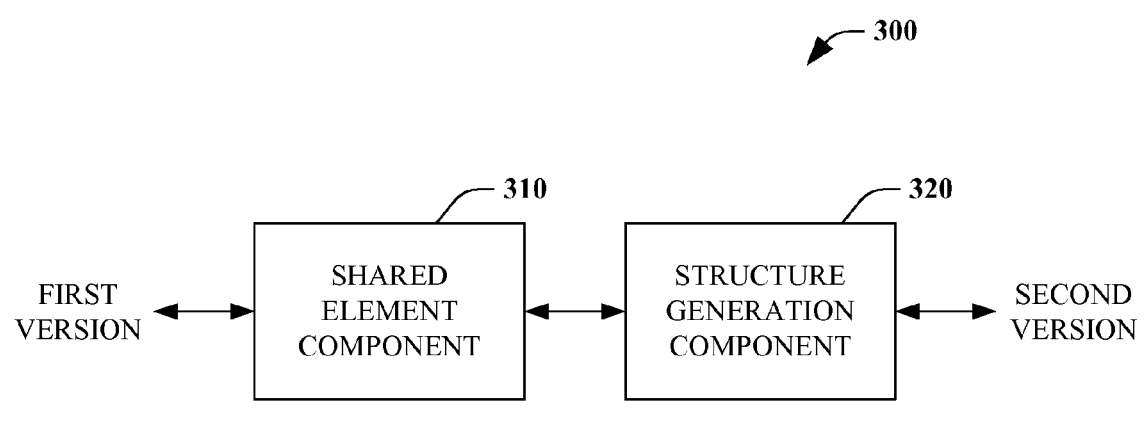
FIG. 3 is a block diagram of a version system according to an aspect of the subject disclosure.

Turning attention to FIG. 3, a version system 300 is illustrated in accordance with an aspect of the claimed subject matter. Where immutable structures are employed, there is a potential to utilize large amounts of memory to hold various versions. For example, a new version of an immutable stack is generated with each push or pop operation (or equivalent). Accordingly, version system 300 can be employed by one or more parse system components such as lexical analyzer 110 and syntactic analyzer 120. As shown, the system 300 includes a shared element component 310 and a structure generation component 320.

The shared element component 310 identifies elements that are common to a first version and a yet to be produced second version. The communicatively coupled structure generation component 320 produces a new structure adding new elements and/or removing old elements, wherein shared elements need not be constructed but rather simply referenced or linked. However, in some instances parent elements can be rewritten. This significantly reduces resource utilization associated with producing multiple copies of immutable structures.

Figure 4A:
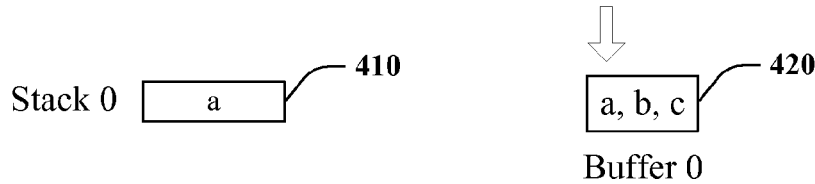
FIGS. 4a-d illustrate iterations of exemplary lexical analysis utilizing immutable structures.
Figure 4B:
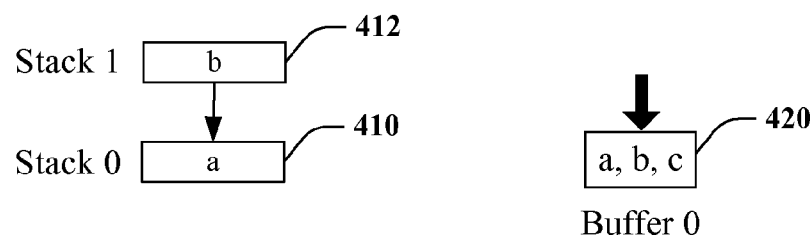
Figure 4C:
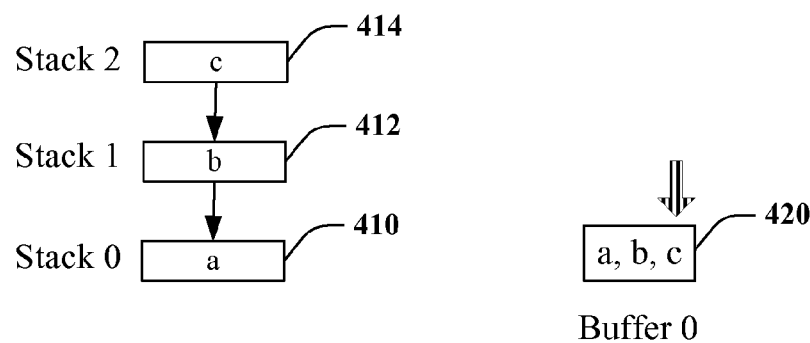
Figure 4D:
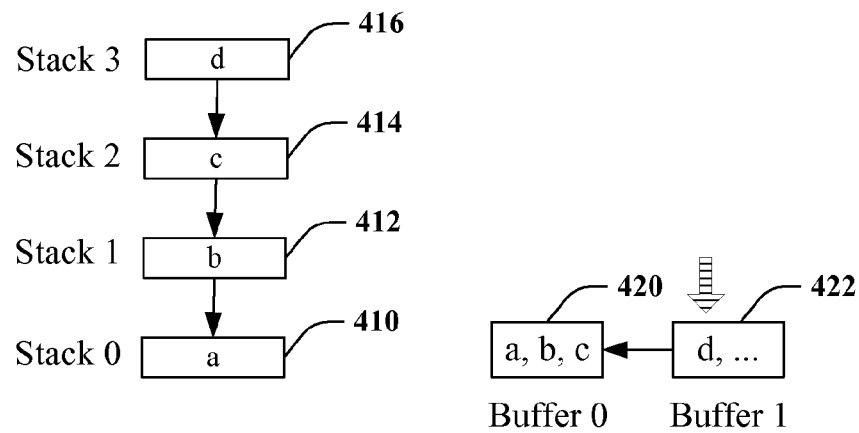

Turning to FIGS. 4a-d, iterations of exemplary lexical analysis is illustrated utilizing immutable structures to facilitate clarity and understanding with respect to aspects of the claimed subject matter. In each case, there are one or more immutable stacks (e.g., stack configuration) and one or more immutable buffers (e.g., buffer configuration). While the buffers are populated with data in these examples, it is to be noted that such data can be realized lazily as needed. Referring first to FIG. 4a, a single stack "stake 0" 410 is depicted as well as an input buffer "buffer 0" 420. The stack 410 includes one element "a", which is identified by a pointer into the input buffer 420. FIG. 4b shows a stack configuration including two stacks or versions "stack 0" 410 and "stack 1" 412, where the latter references or links to the former. A new pointer is also generated identifying the second element in the input buffer 420 pointing to "b" that is embodied in "stack 1" 412. Similarly, FIG. 4c adds another immutable stack or version "stack 2" 414 to the set of stacks linked to the pervious stack "stack 1" 412 in accordance with generation of a new pointer that points to character "c" captured "stack 2" 414. FIG. 4d illustrates yet another element that begets construction of a new stack "stack 3" 416 including the element "d" that is linked to "stack 2" 414 Moreover, another immutable buffer "buffer 1" 422 is created and linked to the previous buffer "buffer 0" 420 since the later had been processed. A new pointer is create and points to "d" which is added by generation of a new immutable stack "stack 3" 416 linked to the previous stack "stack 2" 414.

Figure 5A:
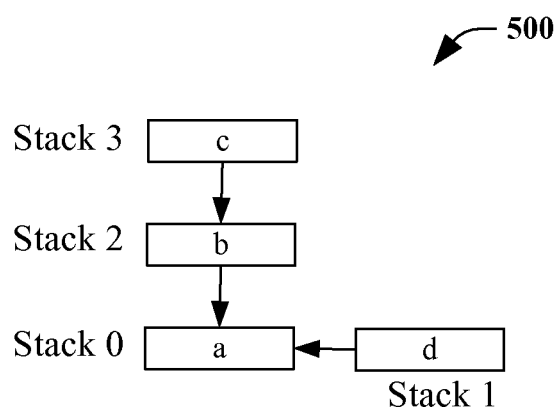
FIGS. 5a-b graphically depict two exemplary stack configurations to aid understanding of aspects of the subject disclosure.
Figure 5B:
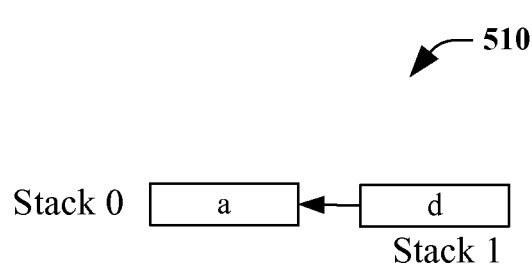

FIGS. 5a-b illustrate further examples of interaction with immutable structures, namely immutable stacks to aid clarity and understanding with respect to aspects of the claimed subject matter. As shown in FIG. 5a, an immutable stack configuration 500 is shown where first "a" is pushed forming "stack 0", then on that initial stack both "d" ("stack 1), and "b" ("stack 2") then "c" ("stack 3") are pushed. Rather than pointing to solely one item, here the stack configuration 500 provides an example of a cactus stack where both "stack 1" and "stack 2" point to "stack 0." Where nodes "b" and "c" are subsequently removed stack configuration 510 results, including "stack 0" and "stack 1." Furthermore, it is to be appreciated that where nodes "a," "b," and "c" are deleted, configuration 510 will still result since there is a copy of node "a" that corresponds to "b" and "c" and a copy that corresponds to "d."

Figure 6:
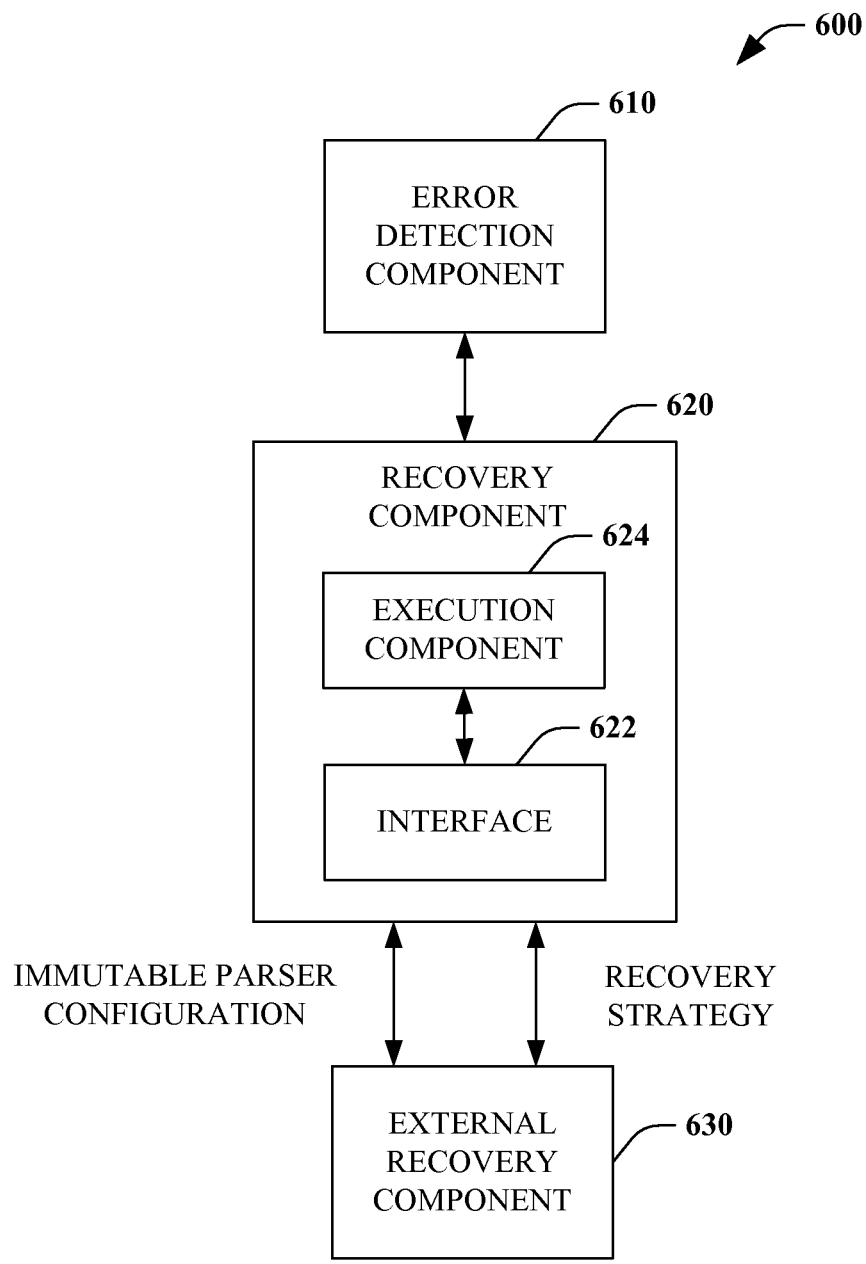
FIG. 6 is a block diagram of an error recovery system in accordance with an aspect of the disclosed subject matter.

FIG. 6 depicts an error recovery system 600 in accordance with an aspect of the claimed subject matter. The system 600 includes an error detection component 610 that identifies an error in a parsing process. Where the parser operates in the contexts of an IDE (Integrated Development Environment), errors are more a norm than an exception, since the parser is often operating over an incomplete program. However, errors are typically present with regularity in complete programs and batch compilers as well. Upon identification of an error, communicatively coupled recovery component 620 can resolve the error to allow parsing to continue, for example.

In accordance with one embodiment, the recovery component 620 can seek assistance from other methods, functions, services, and/or the like. In particular, the recovery component 620 includes an interface component 622 that can communicate with an external recovery component 630. For example, the interface component 622 can provide the parser configuration at the time of the error to the external error recovery system 630. The external recovery component 630 can subsequently determine a cause of the error and a strategy for recovering, which can be communicated back to the recovery component 620 by way of interface component 622. For example, the strategy can identify changes that should be made to the configuration. Execution component 624 can execute or implement an identified strategy. For instance, the execution component 624 can generate a new immutable parser configuration to replace the old configuration.

It is to be appreciated that the error recovery system 600 operates in a safe manner. In one instance, since the configuration is immutable, it is safe for a parsing system to provide this information to another process without fear that the process will compromise the system. Safety is further added by reserving changes for solely the parsing system and seeking recovery strategies or recommendations, as opposed to allowing another method, process, service or the like to generate a new immutable type.

Figure 7:
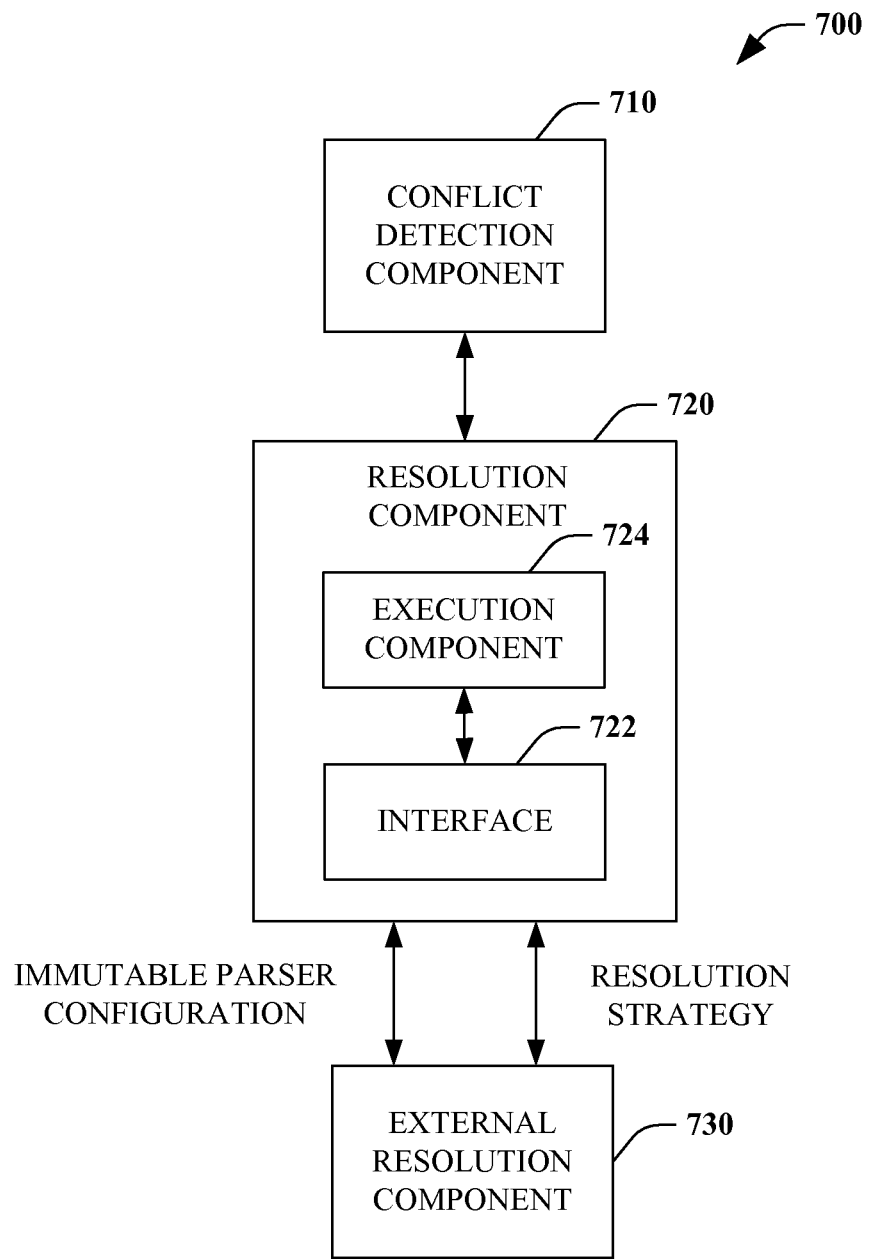
FIG. 7 is a block diagram of an ambiguity resolution system according to an aspect of the disclosure.

FIG. 7 is a block diagram of an ambiguity resolution system 700 in accordance with an aspect of the claimed subject matter. Unlike errors in which no path is available for further processing, ambiguities or conflicts exist when there is more than one way to continue parsing. Conflict detection component 710 identifies such conflicts or ambiguities during parsing. Conflict resolution component 720 is a mechanism for resolving conflicts. While the conflict resolution component 720 can handle such resolution internally, it is also able to seek external assistance. To that end, the resolution component 720 includes an interface component 722 that interacts with an external conflict resolution component 730. The external conflict resolution component can comprise a different method, function, process server or the like than that employed by a parser. More particularly, the interface component 722 can transmit the current immutable parser configuration to the resolution component 730. From the configuration, various functions and/or analysis are performed to determine how to resolve the conflict. In one embodiment, recovery strategies can be associated with particular parser configurations. Accordingly, the external resolution component need only match the current configuration to configuration associated with a strategy that identifies how to resolve the conflict. In any event, the identified strategy can be passed back to resolution component 720 by way of interface 722. Subsequently, execution component 724 can execute or implement the conflict resolution strategy. For example, the current parser configuration can be altered.

Note that ambiguity resolution system 700 is analogous to the error recovery system 600. Accordingly, the same safety benefits are afforded. In brief, safety is ensured by passing an immutable parser state and accepting resolution or recovery strategies as suggestions rather than allowing an external process or the like to directly alter parser state with respect to mutable and/or immutable structures.

Figure 8:
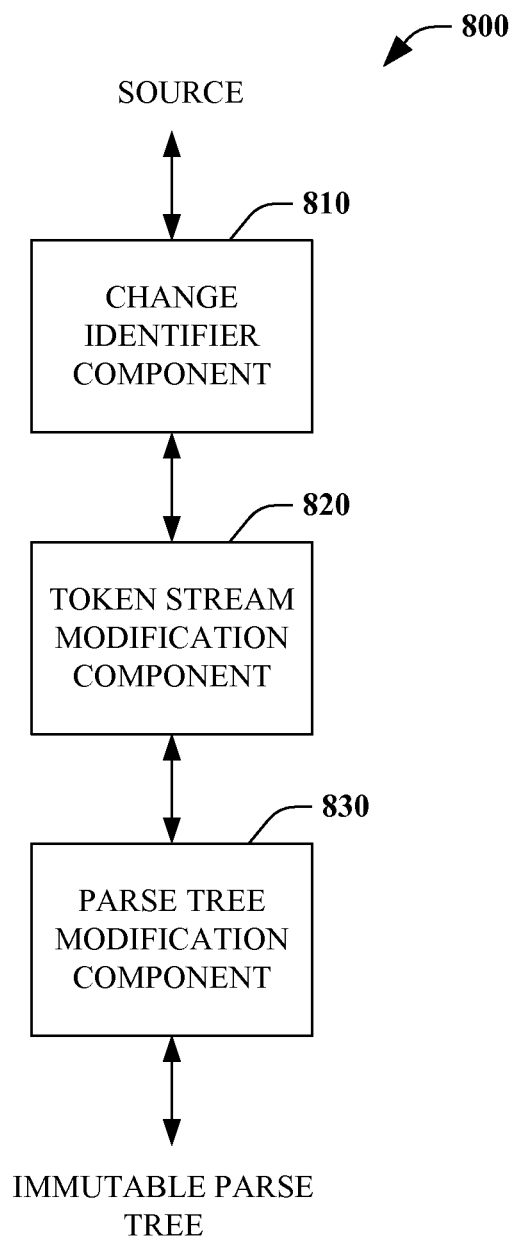
FIG. 8 is a block diagram of a system for effecting change with respect to immutable structures according to an aspect of the disclosure.

Referring to FIG. 8, system 800 that effects change to immutable structures in an incremental parsing scenario is illustrated. The system includes a change detection component 810 that identifies changes or desired changes. For example, consider parsing in an IDE context. Upon text edit (e.g., addition, removal, alteration), an immutable parse tree should be altered to reflect changes. More specifically, a new token stream is generated from which a new parse tree is constructed. The changed detection component 810 can identify such changes in text and initiate execution of token stream modification component 820.

The token stream modification component 820 determines which tokens are affected by an identified modification and accordingly need to be reprocessed. Given a start and end position of an edit, the token stream modification component 820 determines the first and last tokens this edit touches (including right at the edge). In accordance with one exemplary implementation, if the edit intersects tokens, then it appends the parts of tokens not touched by the edit. This aligns everything and makes processing much easier since intra-token edits need not be handled. Now, the component 820 can determine text to scan or lex. This is based on the tokens to be rescanned as well as any new text. The scanning should not stop until all of the tokens in a look-back set of the first affected token, all of the contents of newly improved text change, and the last affected token are processed. As a result, the token stream modification component 820 produces is a new immutable token stream that can share as many tokens with the previous token stream as possible.

Parse tree modification component 830 utilizes the new immutable token stream to produce a new immutable parse tree that similarly shares as much as possible from the previous tree. In particular, nodes can be generated for each newly added token or syntactic expression. Further, explicitly or implicitly data shared with a previous immutable tree is linked. Still further yet, parents of newly added children can be rewritten.

Figure 9:
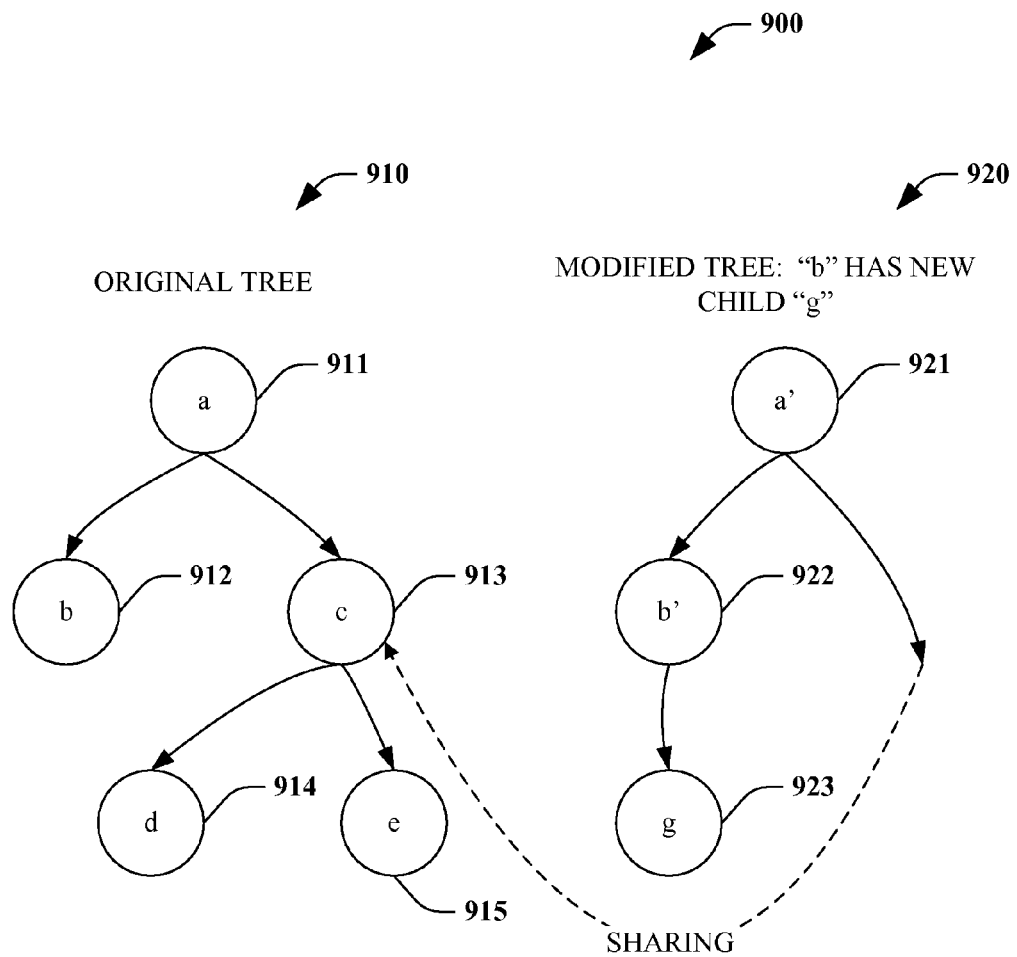
FIG. 9 illustrates modification of an exemplary parse tree in accordance with aspects of the subject disclosure.

FIG. 9 depicts graphically modification of an exemplary immutable parse tree to facilitate clarity with respect to aspects of the claimed subject matter. Original parse tree 910 includes root node "a" 911 with children "b" 912 and "c" 913. The node "c" 913 also has two children "d" 914 and "e" 915. The original tree 910 is to be modified to include node a new node "g" as a child of node "b" 912. This provides new "modified" tree 920. As shown, the modified tree 920 includes rewritten root "a'" 921 and child "b'" 922 as well as the new node "g" 923. The modified tree 920 need not include node "c" 913 and its children since it can be shared between versions and/or lazily computed to enable efficient memory utilization, among other things.

From the illustrations of original tree 910 and modified tree 920, the significance of immutability can be appreciated. In particular, it is important that trees be immutable where sub-trees are shared. If the sub-tree could be modified, the invariance of the modified tree 920 would be negatively impacted, because it is assumed that only new parts of things that are modified are built. Accordingly, it is desirable to ensure that no one can modify the sub-tree "c" 913 with child nodes "d" 914 and "e" 915.

Figure 10A:
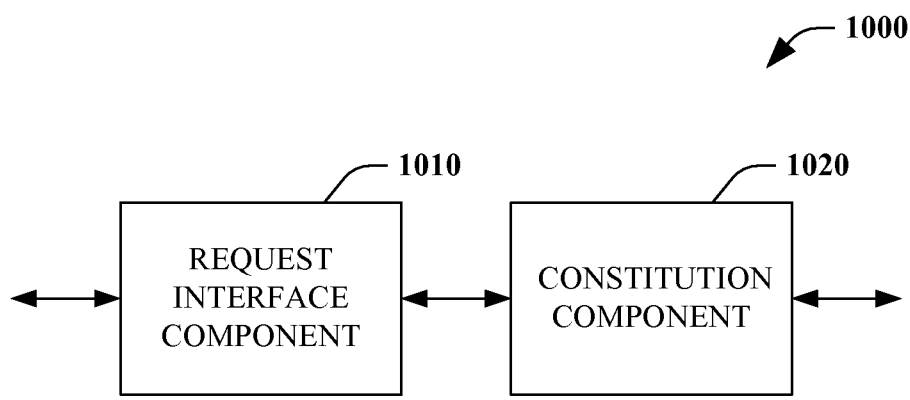
FIG. 10a is a block diagram of a lazy computation system in accordance with an aspect of the disclosure.

Referring to FIG. 10a, a lazy computation system 1000 is illustrated in accordance with an aspect of the claimed subject matter. Immutable structures enable lazy computation. If things are immutable, they can be removed and subsequently reconstructed. In other words, since things are not changing whether or not they are in memory does not matter, because they can be reconstructed given that they are going to be the same. The system 1000 includes request interface component 1010 and constitution component 1020. The request interface component 1010 receives or retrieves a request for data. The constitution component 1020 returns the requested data to the interface component 1010. Where the data is not constituted or realized, it can be constituted or reconstituted. In other words, the data can be computed and saved in memory as needed in response to requests.

Figure 10B:
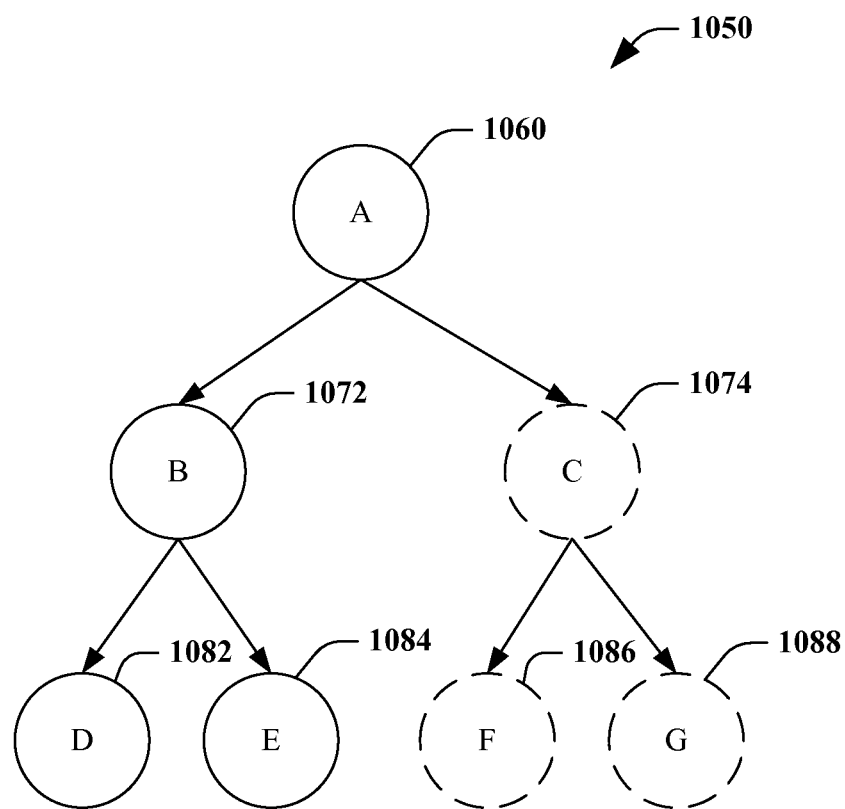
FIG. 10b is an exemplary parse tree to illustrate lazy computation according to a disclosed aspect.

FIG. 10b depicts a partially constituted parse tree 1050 in accordance with an aspect of the claimed subject matter. The tree 1050 includes constituted or root node "A" 1060 with children "B" 1072 and "C" 1074. The node "B" 1072 also includes two children "D" 1082 and "E" 1084. The node "C" 1074 has two children "F" 1086 and "G" 1088. The root node "A" 1060 and the sub-tree associated with node "B" 1072 are both constituted where as the sub-tree associated with node "C" 1074 is not realized. Accordingly, where a request concerns node "C" 1074, "F" 1086, and/or G" 1088, such data will need to be constituted or computed.

Figure 11:
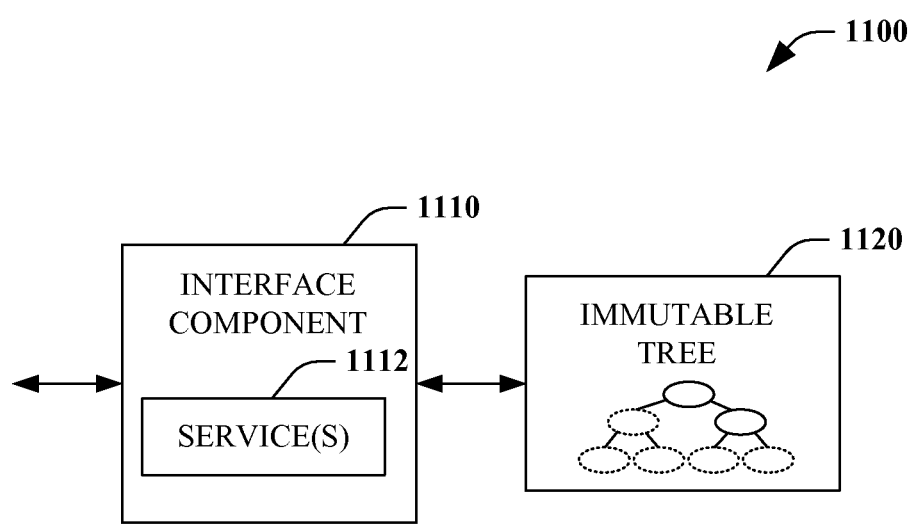
FIG. 11 is a block diagram of an immutable parse-tree interaction system in accordance with an aspect of the disclosure.

FIG. 11 illustrates a parse-tree interaction system 1100 in accordance with an aspect of the claimed subject matter. The system 1100 includes an interface component 1110 including one or more services 1112 communicatively coupled to an immutable parse tree 1120. In accordance with one embodiment, interface component 1110 can be implemented in a wrapper design pattern around the immutable parse tree 1120. Additionally or alternatively, the interface component 1110 can be embodied as a view tree. In any event, the services 1112 acquire or compute information from the immutable tree 120 and provide such information back to a requesting entity.

By way of example and not limitation, one or more services 1112 can pertain to identifying parents and/or children in a version of the immutable tree 1120. In one instance, an immutable tree can be built from the bottom up. Since children are constructed prior to parents, parents are unknown at the time of child production. Consequently, a node cannot simply be asked to return its parent, because it was not encoded with that information unless of course a parent and child are created at the same time, which most programming languages do not allow. Accordingly, a service 1112 can compute a parent or parents for an identified node by way of analysis of tree structure. In one instance, parents can be lazily computed. However, computation of parents may involve computation of other parents thereby amortizing computational cost.

Immutability allows for safe sharing and duplication, among other things. Accordingly, parallelism and distribution are enabled. In particular, a copy cannot be differentiated from an original, which is okay, because they are not going to change anyway. For example, in context of parsing and an IDE, code analysis may be desired, which can be potentially expensive. Immutable trees are useful here for at least two reasons. First, a copy of a parse tree can be provided without having to worry about unexpected and/or undesirable changes. Second, the copy can be duplicated to allow parallel analysis. For instance, portions of a conditional statement can be analyzed concurrently. Furthermore, it should be noted that an "undo" operation in an IDE becomes trivial rather than very complex. In essence, "undo" simply involves referencing a different parser configuration, for example.

The aforementioned systems, architectures, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. For example, a parser can include separate components for lexical and syntactic analysis or a single component that performs both functions. Communication between systems, components and/or sub-components can be accomplished in accordance with either a push and/or pull model. The components may also interact with one or more other components not specifically described herein for the sake of brevity, but known by those of skill in the art.

Furthermore, as will be appreciated, various portions of the disclosed systems above and methods below can include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, such mechanisms can be utilized to facilitate predictive computation and caching of portions of lazily computed structures to enable efficient processing. For instance, inferences can be made regarding a parse tree and contextual information that suggest that particular portions are likely to be needed soon.

In view of the exemplary systems described supra, methodologies that may be implemented in accordance with the disclosed subject matter will be better appreciated with reference to the flow charts of FIGS. 12-15. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Figure 12:
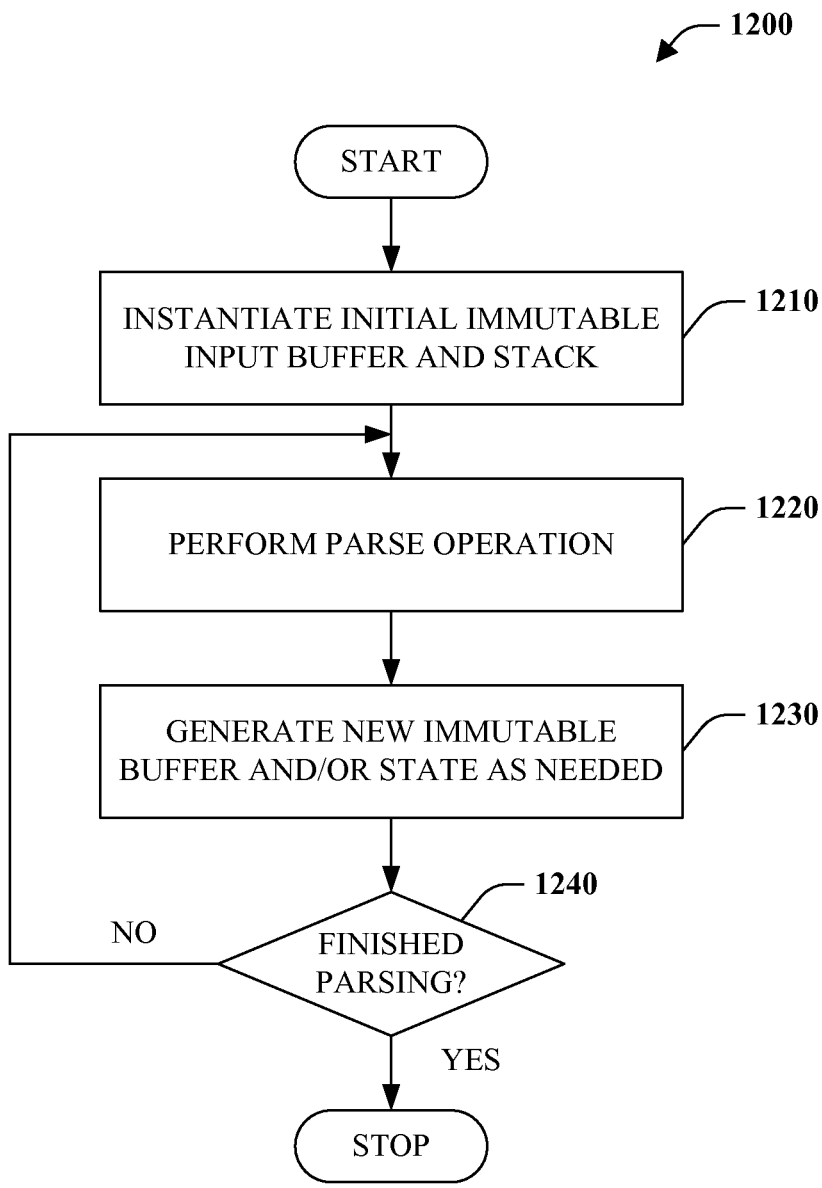
FIG. 12 is a flow chart diagram of a method of parsing utilizing immutable structures in accordance with an aspect of the disclosure.

Referring to FIG. 12, a method of parsing 1200 is illustrated in accordance with an aspect of the claimed subject matter. At reference numeral 1210, an initial immutable configuration including an immutable input buffer and stack are instantiated. At numeral 1220, a parsing operation is performed. For example, an identified element in the input buffer is analyzed in an attempt to produce a language valid token. At reference 1230, a new immutable configuration, namely a buffer and/or state is generated as needed. For instance, where an element is added to the stack or removed from the stack, a new immutable stack is generated to capture the change. Of course, the new stack can share common elements with the previous stack rather than include all elements in the new stack. At reference 1240, a determination is made as to whether parsing is finished. For instance, it can be determined whether or not an input stream has been completely consumed. If parsing is finished ("YES"), the method simply terminates. Alternatively ("NO"), the method continues at numeral 1220 where another parse operation is performed.

Figure 13:
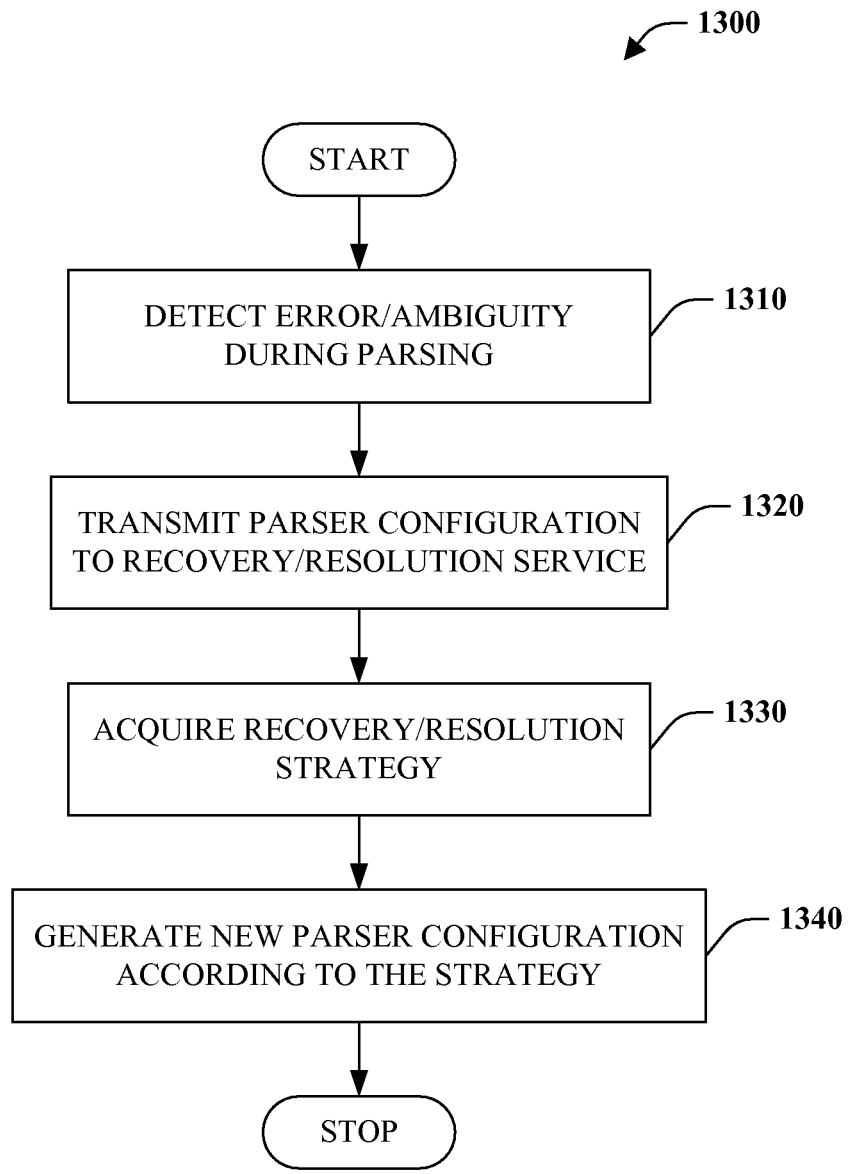
FIG. 13 is a flow chart diagram of a method of recovering from error or resolving a conflict in accordance with a disclosed aspect.

FIG. 13 depicts a method 1300 of error recover/conflict resolution in accordance with an aspect of the claimed subject matter. At numeral 1310, an error or ambiguity is detected during parsing. An error is present when there is no path to continue parsing, whereas an ambiguity exists when there is more than one valid path. At numeral 1320, a parser configuration is passed to a recovery/resolution service, process, method or the like. In response, a recover/resolution strategy is acquired at reference 1330. For example, such strategy can identify changes to the parser configuration. At numeral 1340, a new parser configuration is generated in accordance with the strategy to recover from error or resolve a conflict or ambiguity. In this manner, the parser configuration is unable to be modified by a called service or the like since it passes an immutable copy and returns a strategy or recommendation regarding how to proceed rather than effecting the strategy.

Figure 14:
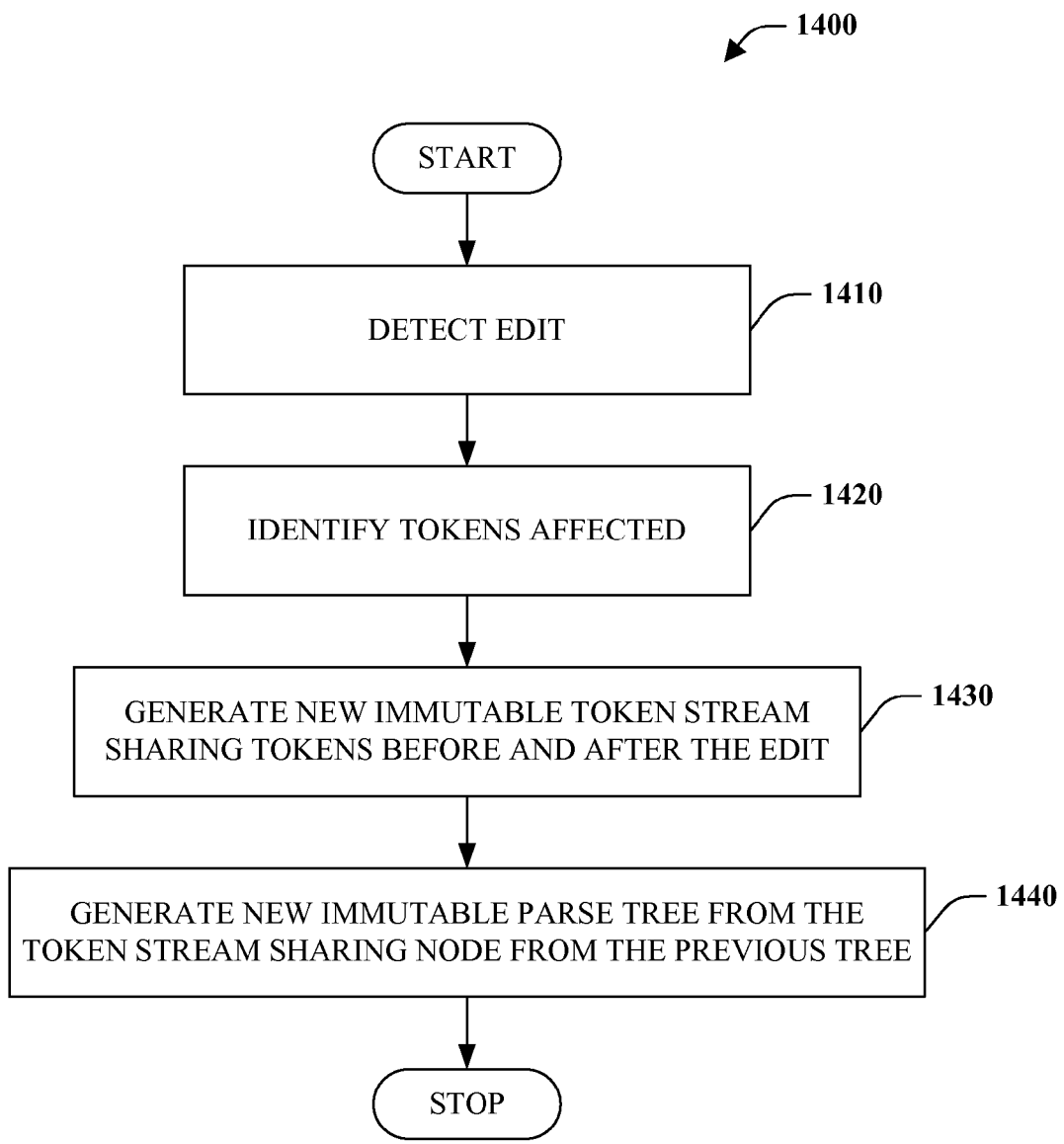
FIG. 14 is a flow chart diagram of an optimal incremental parsing method according to an aspect of the disclosure.

FIG. 14 illustrates an optimal incremental parsing method 1400 in accordance with an aspect of the claimed subject matter. At reference numeral 1410, an edit is detected to a stream of characters as a result of modifications made to a program in an editor during development, for example. At numeral 1420, tokens affected by the modification such as the first and last tokens are identified. A new immutable data structure that captures the token stream can be generated at reference 1630. Generation can comprise scanning or lexing additional text and affected tokens to synchronize parsing state with an editor state, for instance.

Moreover, the newly generated structure(s) can maximally share as many tokens as possible with the previous structure(s). This makes the method 1600 and data structures "O(t)" in time and space, where "t" is the number of tokens affected. For example, the sequence of tokens preceding the first changed token, and the sequence of tokens after the last changed tokens, can be shared with "O(1)" time/space for the new token stream. In one particular embodiment, the method 1600 can be used with a "history service," as found in an IDE, for instance. Accordingly, the method 1600 is suitable for rich code (or text) editors that allow storing a history of all versions and edits, with very little time/space overhead. Further yet, the method 1600 is also suited for a heavily threaded environment.

At reference numeral 1440, a new immutable parse tree can be constructed from the token stream. Similarly, the new parse tree can share nodes with the previous version and/or be subject to lazy computation. For example, where a single node is added to a sub-tree, only that sub-tree needs to be saved or materialized. Other sub-trees can be shared or later computed lazily on an as needed basis.

Figure 15:
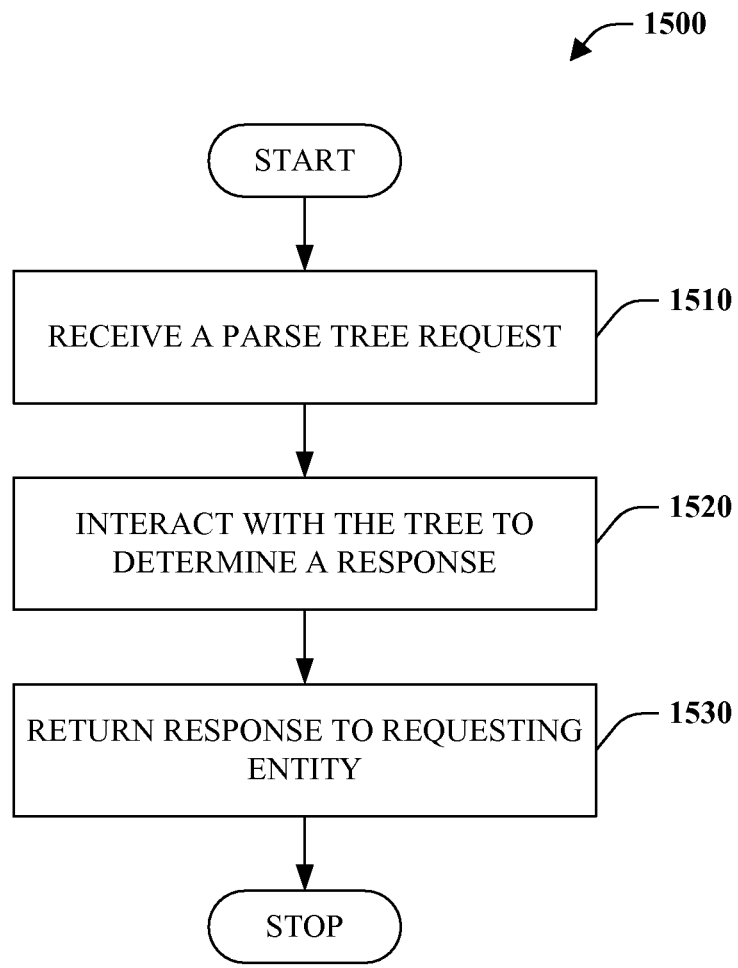
FIG. 15 is a flow chart diagram of a method of interacting with an immutable structure according to a disclosed aspect.

FIG. 15 is a flow chart diagram of a method of interaction with an immutable structure 1500 according to a claimed aspect. At reference numeral 1510, a request is received with respect to an immutable structure such as a parse tree. At numeral 1520, the structure is interacted with to determine a response to the request, and the response is returned to a requesting entity at reference 1530. For example, method 1500 can be embodied as an interface, wrapper, or view of an immutable tree structure. In one instance, the method 1500 can operate with respect to a single version of an immutable structure. Additionally or alternatively, the method 1500 can operate across multiple versions.

The term "parsing" or various forms thereof (e.g., parse, parser, parsed, parses . . . ) is intended to refer to a process associated with lexical and/or syntactic analysis, unless otherwise explicitly noted. Accordingly, where used "parser" can encompass and/or refer to a conventional parser comprising complete lexical and syntactic analysis or a sub-component thereof such as a scanner, lexer, tokenizer, or the like. For example, a lexer can be viewed as a very simple parser.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated that a myriad of additional or alternate examples of varying scope could have been presented, but have been omitted for purposes of brevity.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject innovation.

Furthermore, all or portions of the subject innovation may be implemented as a method, apparatus or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device or media. For example, computer readable media can include but are not limited to storage devices such as magnetic devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 16:
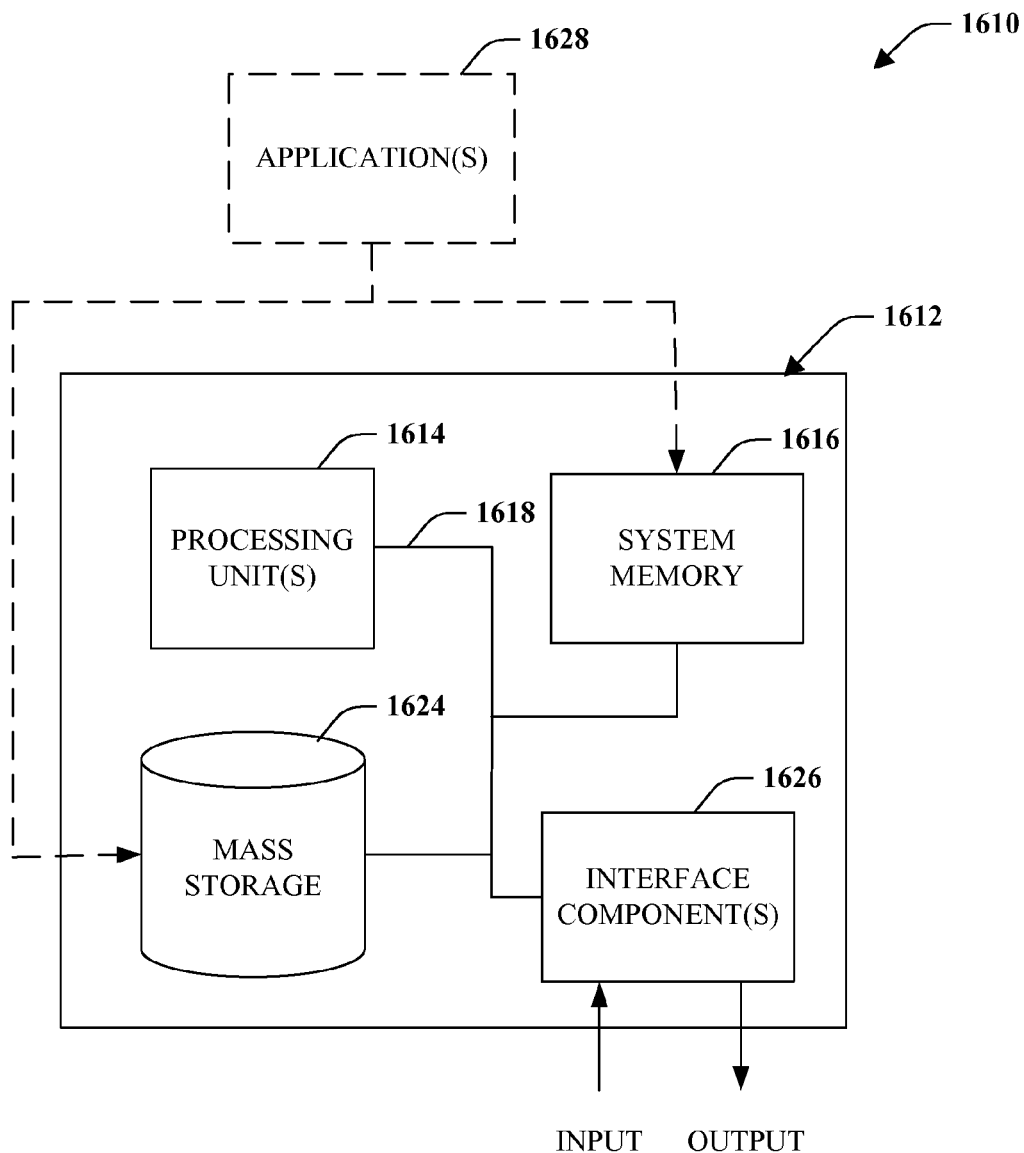
FIG. 16 is a schematic block diagram illustrating a suitable operating environment for aspects of the subject disclosure.
Figure 17:
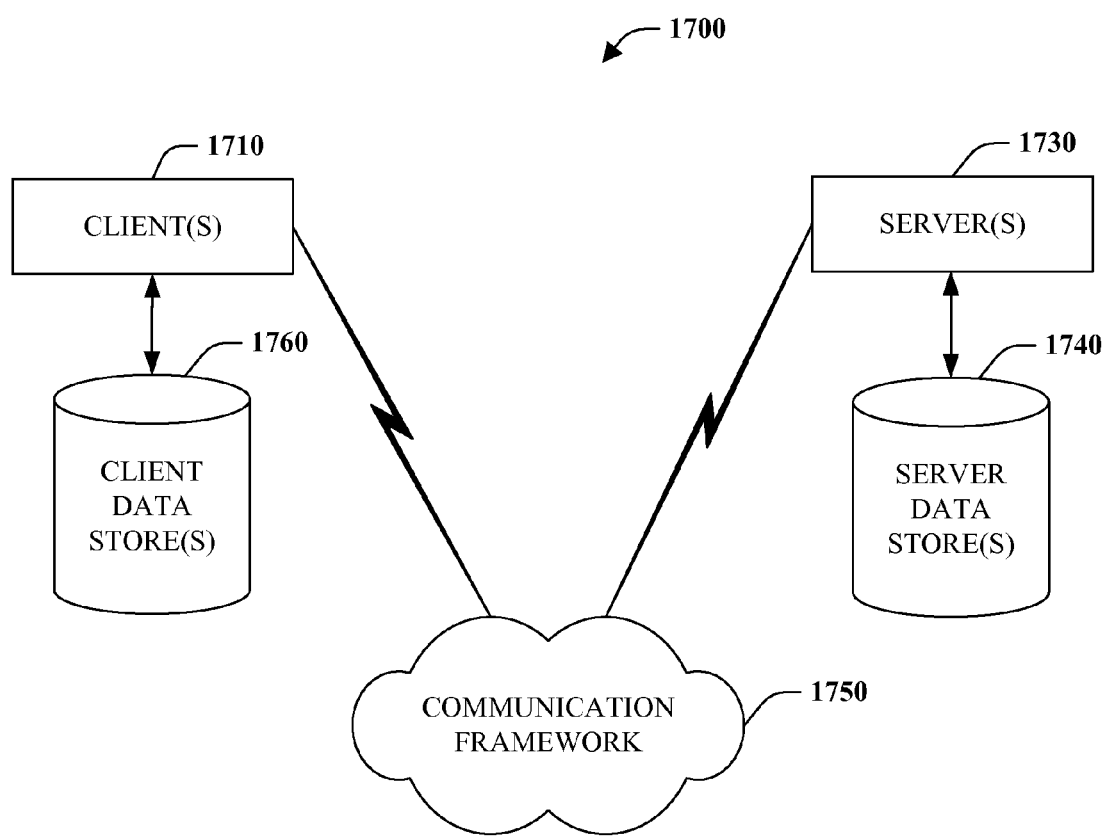
FIG. 17 is a schematic block diagram of a sample-computing environment.

In order to provide a context for the various aspects of the disclosed subject matter, FIGS. 16 and 17 as well as the following discussion are intended to provide a brief, general description of a suitable environment in which the various aspects of the disclosed subject matter may be implemented. While the subject matter has been described above in the general context of computer-executable instructions of a program that runs on one or more computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the systems/methods may be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed subject matter can be practiced on stand-alone computers. In a distributed computing environment, program modules may be located in both local and remote memory storage devices.

With reference to FIG. 16, an exemplary environment 1610 for implementing various aspects disclosed herein includes a computer 1612 (e.g., desktop, laptop, server, hand held, programmable consumer or industrial electronics . . . ). The computer 1612 includes a processing unit 1614, a system memory 1616, and a system bus 1618. The system bus 1618 couples system components including, but not limited to, the system memory 1616 to the processing unit 1614. The processing unit 1614 can be any of various available microprocessors. It is to be appreciated that dual microprocessors, multi-core and other multiprocessor architectures can be employed as the processing unit 1614.

The system memory 1616 includes volatile and nonvolatile memory. The basic input/output system (BIOS), containing the basic routines to transfer information between elements within the computer 1612, such as during start-up, is stored in nonvolatile memory. By way of illustration, and not limitation, nonvolatile memory can include read only memory (ROM). Volatile memory includes random access memory (RAM), which can act as external cache memory to facilitate processing.

Computer 1612 also includes removable/non-removable, volatile/non-volatile computer storage media. FIG. 16 illustrates, for example, mass storage 1624. Mass storage 1624 includes, but is not limited to, devices like a magnetic or optical disk drive, floppy disk drive, flash memory, or memory stick. In addition, mass storage 1624 can include storage media separately or in combination with other storage media.

FIG. 16 provides software application(s) 1628 that act as an intermediary between users and/or other computers and the basic computer resources described in suitable operating environment 1610. Such software application(s) 1628 include one or both of system and application software. System software can include an operating system, which can be stored on mass storage 1624, that acts to control and allocate resources of the computer system 1612. Application software takes advantage of the management of resources by system software through program modules and data stored on either or both of system memory 1616 and mass storage 1624.

The computer 1612 also includes one or more interface components 1626 that are communicatively coupled to the bus 1618 and facilitate interaction with the computer 1612. By way of example, the interface component 1626 can be a port (e.g., serial, parallel, PCMCIA, USB, FireWire . . . ) or an interface card (e.g., sound, video, network . . . ) or the like. The interface component 1626 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer, and the like. Output can also be supplied by the computer 1612 to output device(s) via interface component 1626. Output devices can include displays (e.g., CRT, LCD, plasma . . . ), speakers, printers, and other computers, among other things.

FIG. 17 is a schematic block diagram of a sample-computing environment 1700 with which the subject innovation can interact. The system 1700 includes one or more client(s) 1710. The client(s) 1710 can be hardware and/or software (e.g., threads, processes, computing devices). The system 1700 also includes one or more server(s) 1730. Thus, system 1700 can correspond to a two-tier client server model or a multi-tier model (e.g., client, middle tier server, data server), amongst other models. The server(s) 1730 can also be hardware and/or software (e.g., threads, processes, computing devices). The servers 1730 can house threads to perform transformations by employing the aspects of the subject innovation, for example. One possible communication between a client 1710 and a server 1730 may be in the form of a data packet transmitted between two or more computer processes.

The system 1700 includes a communication framework 1750 that can be employed to facilitate communications between the client(s) 1710 and the server(s) 1730. The client (s) 1710 are operatively connected to one or more client data store(s) 1760 that can be employed to store information local to the client(s) 1710. Similarly, the server(s) 1730 are operatively connected to one or more server data store(s) 1740 that can be employed to store information local to the servers 1730.

Client/server interactions can be utilized with respect with respect to various aspects of the claimed subject matter. By way of example and not limitation, one or more of the components and/or systems can be embodied as a network or web services provided by one or more servers 1730 to one or more clients 1710 across the communication framework 1750. In one specific instance, a parser system can transmit an immutable parser configuration across the communication framework 1750 to server based error-recovery or conflict-resolution service, which determines a strategy and passes it back to the parser system for implementation.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

What is claimed is:

1. An immutable parser system, comprising:
   a processor coupled to a memory, the processor configured to execute the following computer-executable components stored in the memory:
   a first component configured to perform lexical analysis of an input sequence to produce a sequence of tokens; and
   a second component configured to perform syntactic analysis on the tokens to determine a grammatical structure, at least one of the first and second components employ an immutable parser configuration including an immutable stack and an immutable input buffer.

2. The system of claim 1, the second component is configured to produce an immutable parse tree.

3. The system of claim 2, the second component is configured to generate multiple versions of the parse tree that share common pre-existing portions.

4. The system of claim 3 further comprising a third component configured to provision one or more services to respond to one or more inquires regarding the parse tree.

5. The system of claim 4, at least one of the one or more services defers computation of the parse tree or portions thereof until needed.

6. The system of claim 1, the immutable input buffer saves a history of enumeration for potential backtracking.

7. The system of claim 1, the immutable stack is a rooted directed, acyclic graph that saves multiple pasts.

8. The system of claim 1 further comprising an interface component configured to pass the immutable parser configuration to another component for conflict resolution or error recover without risk of parser state corruption.

9. The system of claim 1, one or both of the first and second components exploit the immutability of the parser configuration to execute in parallel.

10. A parsing method, comprising:
    employing at least one processor configured to execute computer-executable instructions stored in memory to perform the following acts:
    parsing an input stream with one or more immutable parser configurations including an immutable stack and immutable lookahead buffer; and
    producing an immutable parse tree as a function of the parsing.

11. The method of claim 10 further comprising deferring computation of input elements from the lookahead buffer until needed.

12. The method of claim 10 further comprising identifying a conflict during parsing and passing a current parser configuration to a method that identifies a conflict resolution strategy based on the configuration.

13. The method of claim 10 further comprising detecting a parsing error and passing a current parser configuration to a method that affords an error recovery strategy as a function of the configuration.

14. The method of claim 10 further comprising forking execution of parsing operations across multiple threads of execution processing utilizing copies of the immutable configuration.

15. The method of claim 10 further comprising producing different versions of the stack and lookahead buffer that share common unchanged elements.

16. The method of claim 10 further comprising producing multiple versions of the parse tree that share common, unchanged nodes.

17. The method of claim 16 further comprising:
    detecting a change in the input stream;
    reparsing the input stream to produce a new immutable token stream that shares tokens common to a previous stream; and
    producing a new immutable parse tree that shares nodes with a previous tree.

18. A computer-readable storage medium having stored thereon instructions that when executed perform a method, the method comprising:
    generating a second immutable token stream that shares tokens with a first immutable token stream by reference to at least a portion of the first immutable token stream after detecting a change in an input; and
    constructing a second immutable parse tree that shares nodes with a first immutable parse tree by reference to at least a portion of the first immutable parse tree as a function of the first and second immutable token streams generating the second immutable token stream with an immutable parser configuration including an immutable stack and immutable lookahead buffer.

19. The computer-readable storage medium of claim 18, the method further comprises determining tokens affected by the change in the input.

* * * * *